US012581526B2

(12) United States Patent
Jacobsen et al.

(10) Patent No.: US 12,581,526 B2
(45) Date of Patent: Mar. 17, 2026

(54) RADIO RESOURCE ALLOCATION PATTERN

(71) Applicant: Nokia Technologies Oy, Espoo (FI)

(72) Inventors: Thomas Haaning Jacobsen, Aalborg (DK); Claudio Rosa, Aalborg (DK); Dawid Koziol, Wroclaw (PL); Troels Emil Kolding, Aalborg (DK); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 262 days.

(21) Appl. No.: 18/252,270

(22) PCT Filed: Oct. 22, 2021

(86) PCT No.: PCT/EP2021/079387
§ 371 (c)(1),
(2) Date: May 9, 2023

(87) PCT Pub. No.: WO2022/111920
PCT Pub. Date: Jun. 2, 2022

(65) Prior Publication Data
US 2024/0015781 A1 Jan. 11, 2024

(30) Foreign Application Priority Data
Nov. 26, 2020 (EP) .................................... 20209951

(51) Int. Cl.
*H04W 72/543* (2023.01)
*H04W 28/02* (2009.01)
(Continued)

(52) U.S. Cl.
CPC ..... *H04W 72/543* (2023.01); *H04W 28/0268* (2013.01); *H04W 28/0967* (2020.05); *H04W 72/04* (2013.01)

(58) Field of Classification Search
CPC ..... H04L 5/0058; H04L 47/28; H04L 47/283; H04L 5/0048; H04W 72/543;
(Continued)

(56) References Cited

U.S. PATENT DOCUMENTS

| | | |
|---|---|---|
| 2011/0199908 A1 | 8/2011 | Dalsgaard et al. |
| 2017/0149514 A1 | 5/2017 | Comsa et al. |

(Continued)

FOREIGN PATENT DOCUMENTS

| | | |
|---|---|---|
| EP | 3478019 A1 | 5/2019 |
| WO | 2019/068926 A1 | 4/2019 |

OTHER PUBLICATIONS

Office action received for corresponding European Patent Application No. 20209951.1, dated Jan. 3, 2025, 3 pages.
(Continued)

*Primary Examiner* — Khoa Huynh
(74) *Attorney, Agent, or Firm* — Barta Jones, PLLC

(57) ABSTRACT
A method comprising configuring a first radio resource allocation pattern, identifying that a quality of service violation may occur during a measurement gap of a terminal device when the first radio resource allocation pattern is utilized by the terminal device, determining at least one second radio resource allocation pattern that may be utilized by the terminal device during the measurement gap, and transmitting the at least one second radio resource allocation pattern to the terminal device.

8 Claims, 9 Drawing Sheets

(51) Int. Cl.
  *H04W 28/08*      (2023.01)
  *H04W 72/04*      (2023.01)

(58) Field of Classification Search
  CPC ......... H04W 28/0268; H04W 28/0967; H04W
            72/04; H04W 36/0088; H04W 28/0231;
                                      H04W 28/24
  See application file for complete search history.

(56)              References Cited

U.S. PATENT DOCUMENTS

| | | | |
|---|---|---|---|
| 2019/0229868 A1* | 7/2019 | Siomina ................ | H04W 24/10 |
| 2019/0274146 A1 | 9/2019 | Tang et al. | |
| 2019/0306734 A1 | 10/2019 | Huang et al. | |
| 2019/0342801 A1 | 11/2019 | Cui et al. | |
| 2020/0015246 A1 | 1/2020 | Vilaipornsawai et al. | |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.
"3rd Generation Partnership Project; Technical Specification Group Radio Access Network; NR; Requirements for support of radio resource management (Release 15)", 3GPP TS 38.133, V15.7.0, Sep. 2019, 1042 pages.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.
"New WID Proposal: Measurement Gap Enhancement for LTE", 3GPP TSG RAN Meeting #71, RP-160604, Agenda: 10.1.4, Intel Corporation, Mar. 7-10, 2016, 7 pages.
"URLLC transmission within measurement gap", 3GPP TSG-RAN WG2 Meeting #108, R2-1914964, Agenda: 6.7.3.4, vivo, Nov. 18-22, 2019, 3 pages.
"Measurement gap skipping for TSN traffic", 3GPP TSG-RAN WG2 Meeting #108, R2-1915919, Agenda: 6.7.3.4, LG Electronics Inc, Nov. 18-22, 2019, pp. 1-2.
"Measurement gaps for TSN traffic", 3GPP TSG-RAN WG2 #107, R2-1909368, Agenda: 11.7.2.2, Ericsson, Aug. 26-30, 2019, 2 pages.
"On handling of URLLC traffic during measurement gaps in uplink", 3GPP TSG-RAN WG2#107, R2-1910824, Agenda: 11.7.2.2, Huawei, Aug. 26-30, 2019, 3 pages.
"URLLC transmission within measurement gap", 3GPP TSG-RAN WG2#107, R2-1910009, Agenda: 11.7.2.2, vivo, Aug. 26-30, 2019, 4 pages.
"IEEE 802.11", Wikipedia, Retrieved on Jun. 2, 2023, Webpage available at : https://en.wikipedia.org/wiki/IEEE 802.11.
Extended European Search Report received for corresponding European Patent Application No. 20209951.1, dated Apr. 12, 2021, 8 pages.
"Discuss on the mechanism to guarantee the survival time", 3GPP TSG-RAN WG2 Meeting #112 electronic, R2-2009870, Agenda: 8.5.4, Lenovo, Nov. 2-13, 2020, 4 pages.
International Search Report and Written Opinion received for corresponding Patent Cooperation Treaty Application No. PCT/EP2021/079387, dated Feb. 3, 2022, 12 pages.

* cited by examiner

800

810
Communication Control

820
Memory

822
Computer Program
Code

830
Communication Interface
TX/RX

840
Scheduler

900

RADIO RESOURCE ALLOCATION PATTERN

FIELD

The following exemplary embodiments relate to wireless communication and ensuring quality of service.

BACKGROUND

Wireless communication enables connecting to various devices in all kinds of environments. This may be beneficial for example in industrial environments as remote monitoring of devices may be enabled. It is important however to have a reliable connection even if the conditions vary and therefore it is beneficial to ensure that quality of service remains at desired level in various situations and conditions.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments.

According to a first aspect there is provided an apparatus comprising at least one processor, and at least one memory including a computer program code, wherein the at least one memory and the computer program code are configured, with the at least one processor, to cause the apparatus to configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

In an exemplary embodiment according to the first aspect, the quality of service violation is determined based on at least one of the following: quality of service, time sensitive communications assistance information parameters, general parameters or reference signals. Further, in this exemplary embodiment according to the first aspect, the general parameters may comprise one or more of a packet delay budget parameter, a maximum data burst volume parameter and/or a communication service availability parameter, and wherein reference signals comprise one or more of synchronization signal block and/or channel state information reference symbol.

In another exemplary embodiment according to the first aspect identifying that a quality of service violation may occur comprises determining that the first radio resource allocation pattern blocks one or more reference signals transmitted by a target access node. In this exemplary embodiment according to the first aspect, the apparatus may further be caused to determine that the first radio resource allocation pattern blocks one or more reference signals transmitted by the target access node and determining if the at least one radio resource allocation pattern may be shifted in time.

In another exemplary embodiment according to the first aspect the second radio resource allocation pattern is appended to an allocation list.

In another exemplary embodiment according to the first aspect the second radio resource allocation pattern is transmitted to the terminal device using one or more of the following: a radio resource control message, a medium access control control element and/or a physical signal.

In another exemplary embodiment according to the first aspect the second radio resource allocation pattern is transmitted to the terminal device by configuring a configured grant or semi-persistent scheduling assignments together with a bitmap.

In another exemplary embodiment according to the first aspect the determining the second radio resource allocation pattern comprises determining for an expected packet arrival an initial time allocation and one or more transmission parameters.

In another exemplary embodiment according to the first aspect the apparatus is further caused to determine that one or more further radio resource allocation patterns, in addition to the first and the second radio resource allocation patterns, and transmitting those to the terminal device. In this exemplary embodiment according to the first aspect, the apparatus may further be caused to transmit an to the terminal device before an occurrence of the measurement gap indicating which radio resource allocation pattern to utilize during the measurement gap.

In another exemplary embodiment according to the first aspect the apparatus is comprised in an access node.

According to a second aspect there is provided an apparatus comprising at least one processor, and at least one memory including a computer program code, wherein the at least one memory and the computer program code are configured, with the at least one processor, to cause the apparatus to receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

In an exemplary embodiment according to the second aspect the apparatus is further caused to determine that a quality of service violation may occur during the at least one measurement gap when utilizing the first radio resource allocation pattern.

In an exemplary embodiment according to the second aspect the apparatus is further caused to determine that a quality of service violation may occur during the at least one measurement gap based on receiving the second radio resource allocation pattern.

In an exemplary embodiment according to the second aspect the first radio resource allocation pattern and the second radio resource allocation pattern are comprised in a configuration message received from the access node.

In an exemplary embodiment according to the second aspect at least one of the first and the second radio resource allocation patterns is acquired from one or more of the following: radio resource control signalling, medium access control control element and/or physical signalling.

In an exemplary embodiment according to the second aspect the first radio resource allocation pattern is received as a configuration of a configured grant or semi-persistent scheduling assignments together with a bitmap.

In an exemplary embodiment according to the second aspect the apparatus is further caused to utilize the first radio resource allocation pattern before and/or after the occurrence of the measurement gap.

In an exemplary embodiment according to the second aspect the apparatus is further caused to receive one or more radio resource allocation patterns, in addition to the first and the second radio resource allocation patterns from the access node. In this exemplary embodiment according to the second aspect the apparatus may further be caused to receiving, from the access node, an indication prior to the occurrence of the measurement gap indicating which radio resource allocation pattern to utilize during the measurement gap. In this exemplary embodiment according to the second aspect the apparatus may still further be caused to determining from the received radio resource allocation patterns a combined radio resource allocation pattern to be utilized during a measurement gap.

In an exemplary embodiment according to the second aspect the apparatus is further caused to the apparatus is comprised in a terminal device.

According to a third aspect there is provided an apparatus comprising means for configuring a first radio resource allocation pattern, identifying that a quality of service violation may occur during a measurement gap of a terminal device when the first radio resource allocation pattern is utilized by the terminal device, determining at least one second radio resource allocation pattern that may be utilized by the terminal device during the measurement gap, and transmitting the at least one second radio resource allocation pattern to the terminal device.

According to a fourth aspect there is provided an apparatus comprising means for receiving, from an access node, a first radio resource allocation pattern, utilizing the first radio resource allocation pattern, receiving, from the access node, a second radio resource allocation pattern, determining that at least one measurement gap occurs and utilizing the second radio resource allocation pattern during the at least one measurement gap.

According to a fifth aspect there is provided a method comprising configuring a first radio resource allocation pattern, identifying that a quality of service violation may occur during a measurement gap of a terminal device when the first radio resource allocation pattern is utilized by the terminal device, determining at least one second radio resource allocation pattern that may be utilized by the terminal device during the measurement gap, and transmitting the at least one second radio resource allocation pattern to the terminal device.

According to a sixth aspect there is provided a method comprising receiving, from an access node, a first radio resource allocation pattern, utilizing the first radio resource allocation pattern, receiving, from the access node, a second radio resource allocation pattern, determining that at least one measurement gap occurs and utilizing the second radio resource allocation pattern during the at least one measurement gap.

According to a seventh aspect there is provided a computer program comprising instructions for causing an apparatus to perform at least the following: configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

According to an eight aspect there is provided a computer program comprising instructions for causing an apparatus to perform at least the following: receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

According to a ninth aspect there is provided a computer program product comprising instructions for causing an apparatus to perform at least the following: configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

According to a tenth aspect there is provided a computer program product comprising instructions for causing an apparatus to perform at least the following: receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

According to an eleventh aspect there is provided a computer program comprising instructions stored thereon for performing at least the following: configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

According to a twelfth aspect there is provided a computer program comprising instructions stored thereon for performing at least the following: receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

According to a thirteenth aspect there is provided a non-transitory computer readable medium comprising program instructions for causing an apparatus to perform at least the following: configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

According to a fourteenth aspect there is provided a non-transitory computer readable medium comprising program instructions for causing an apparatus to perform at least the following: receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

According to a fifteenth aspect there is provided a non-transitory computer readable medium comprising program instructions stored thereon for performing at least the following: configure a first radio resource allocation pattern, identify that a quality of service violation may occur during a measurement gap of a terminal device when the first radio resource allocation pattern is utilized by the terminal device, determine at least one second radio resource allocation pattern that may be utilized by the terminal device during the measurement gap and transmit the at least one second radio resource allocation pattern to the terminal device.

According to a sixteenth aspect there is provided a non-transitory computer readable medium comprising program instructions stored thereon for performing at least the following: receive, from an access node, a first radio resource allocation pattern, utilizing the first radio resource allocation pattern, receive, from the access node, a second radio resource allocation pattern, determine that at least one measurement gap occurs, and utilize the second radio resource allocation pattern during the at least one measurement gap.

LIST OF DRAWINGS

In the following, exemplary embodiments will be described in greater detail with reference to the accompanying drawings, in which FIG. 1 illustrates an exemplary embodiment of a radio access network.

DESCRIPTION OF EMBODIMENTS

Figure 1:
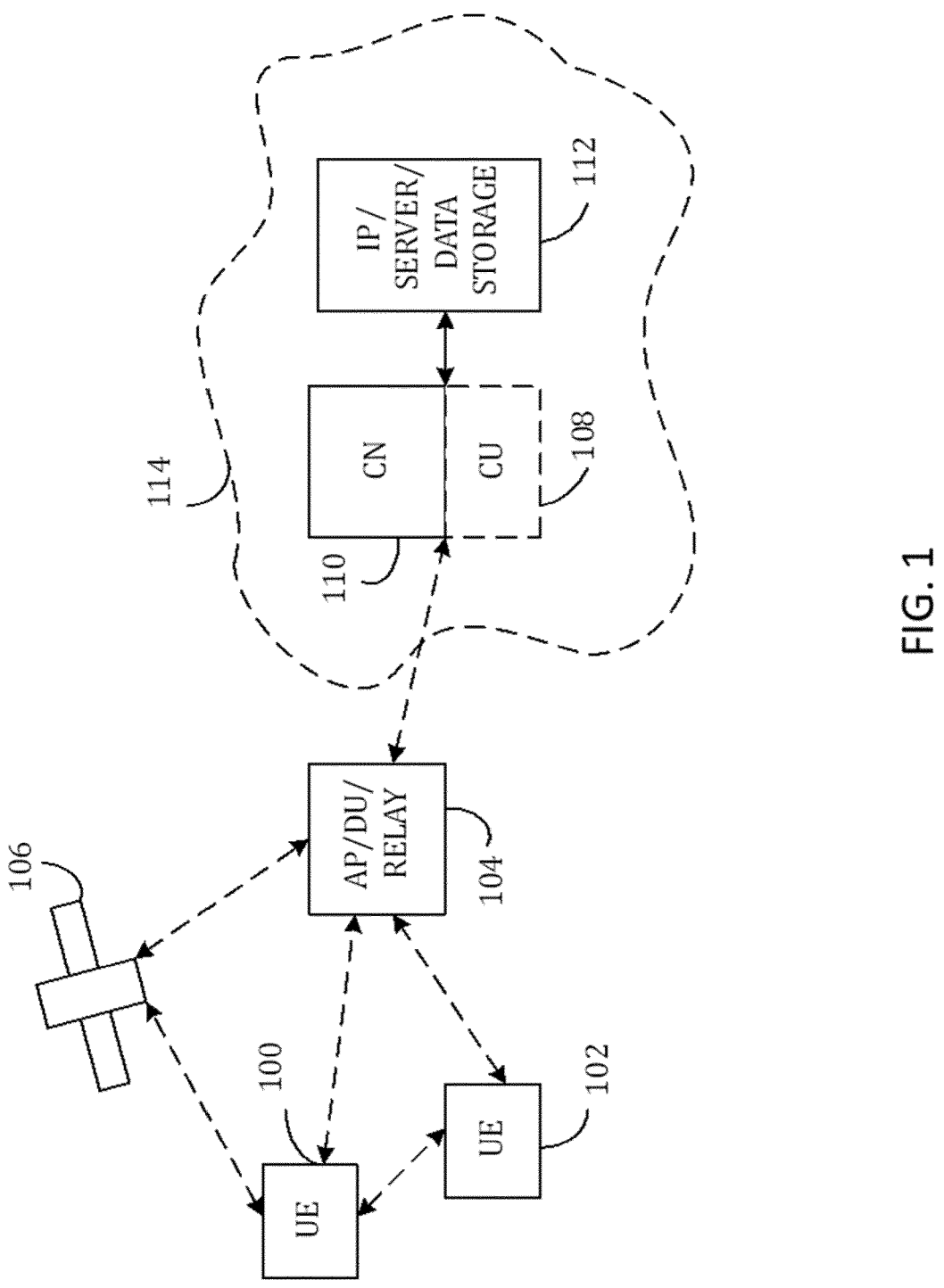

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or 5G-nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solarpowered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). An HNB Gateway (HNB-GW), which may be installed within an operator's network may aggregate traffic from a large number of HNBs back to a core network.

Wireless communication is beneficial in many areas, for example in vehicles, that may be at least partly automated, and in industrial sites. Industrial sites for example may need less cabling if devices can utilize wireless connectivity. Yet, for the wireless connectivity to be useful, it should have guaranteed data packet transmissions, low latency, low packet delay variation and low packet loss. 5G is an example of wireless network communication that may be utilized for example in an industrial environment as part of factory automation. Such automation may require data to be exchanged between various devices such as machinery and robots. The data exchange therefore needs to be reliable. Time-sensitive communication, TSC, addresses this need and 5G can be utilized to achieve time-sensitive communication.

TSC may be applicable for example in situations in which there are bursts of traffic arrival. Such bursts may have a fixed size and/or the bursts may be periodic. If periodicity of bursts and/or size of bursts are known, then a scheduler comprised in an access node providing a cell in which the bursts are at least partly transmitted may determine resource allocation in advance. For example, in 3GPP Rel-16, it is defined that a gNB is able to get information regarding traffic flows based on TSC assistance information, TSCAI, from the core network. Such information may then be utilized by the gNB to assign configured scheduling resources, for example semi-persistent scheduling, SPS, and configured grant, CG, with appropriate parameters such as periodicity and transport block size, to cater for the TSC flows.

As an example of requirements set for TSC traffic scenarios, 3GPP TS 22.104, defines performance requirements for various scenarios. An example of such scenarios is closed-loop automation performance requirement. Such requirements may have strict availability requirements meaning that any packet delivered to a 5G communication network is to be delivered to the other end of the 5G system within a pre-defined transfer interval to meet the E2E latency requirement. Reliability may therefore be defined as a mean time between failures when a failure occurs with a violation to a quality of service parameter. A quality of service parameter may be for example a delay or a survival time. A survival time may be understood as a time interval during which an application is able to operate without receiving a data packet. As an example, the 3GPP specification TS22.104 specifies survival time as the time that an application consuming a communication service may continue without an anticipated message.

Figure 2:
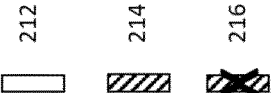
FIG. 2 illustrates an exemplary embodiment of a survival time.
Figure 2:
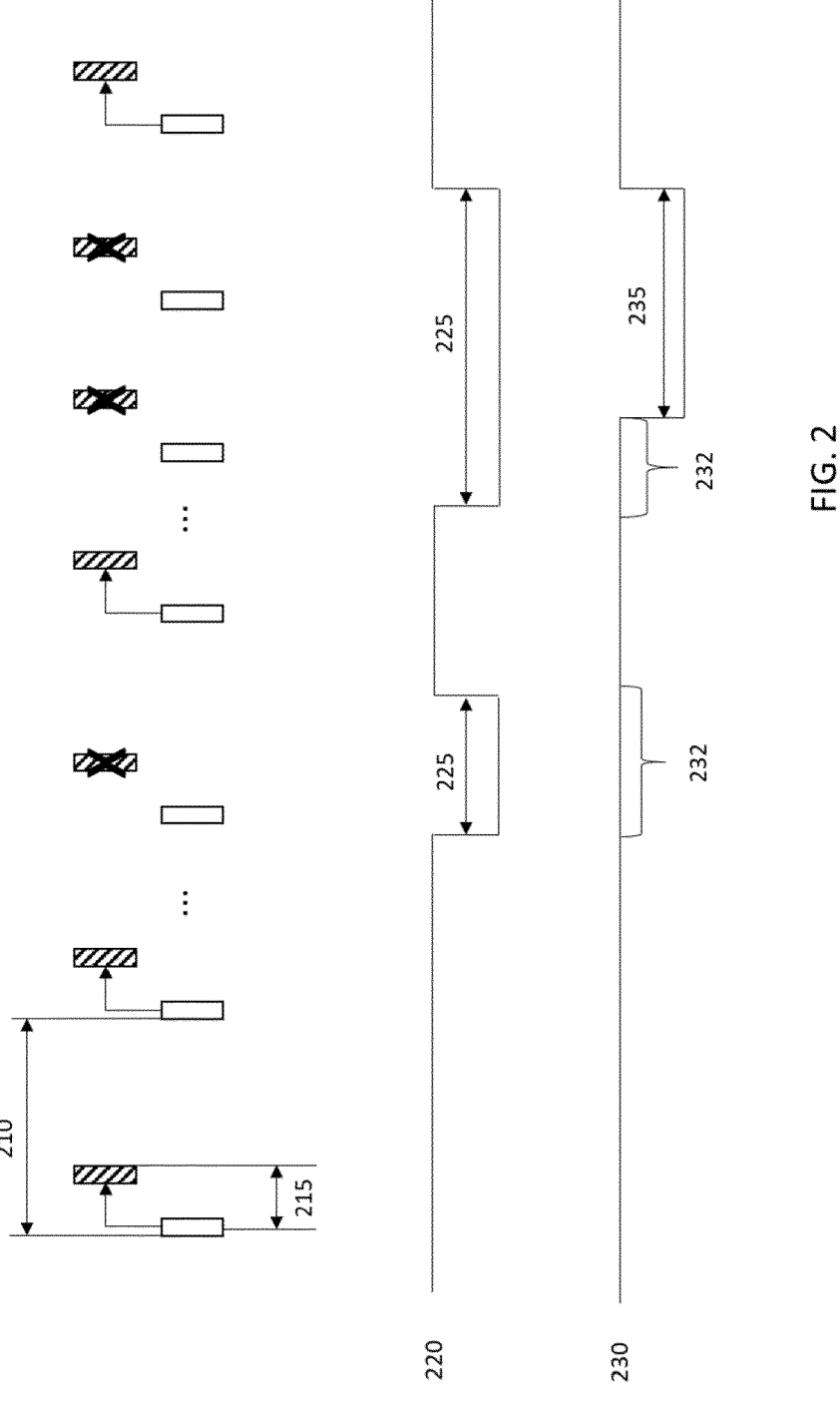

FIG. 2 illustrates an exemplary embodiment of a survival time. In this exemplary embodiment, data packets are transmitted periodically. One period 210 may be understood as the time between sending a first data packet to be transmitted 212 and sending a second data packet to be transmitted 212. Time between sending a data packet to be transmitted 212 and receiving the data packet is an end to end latency. A received data packet is illustrated as 214. As can be seen from the FIG. 2, there may also be data packets that are not received and those are illustrated as 216. The data packets not received 216 coincide timewise with downtime period 225 of a communication service. The status of the communication service 220 may be uptime or there may be a packet loss due to for example systematic errors causing downtime, such as power failures, blocking or radio link failure, or one or more packets may be lost from time to time due to for example random characteristics of the radio channel. The experience of an application layer 230 has in this exemplary embodiment a survival time 232 that coincides with the downtime 225 of the communication service. The survival time 232 may be enough to last the whole duration of a downtime 225, or it may last part of the downtime 225. The survival time 232 may be understood as the time that the communication service 220 consuming a communication service may continue without an anticipated message. The survival time 232 may be expressed for example as a time period or as maximum number of consecutive incorrectly received or lost messages. In other words, the survival time indicates the time available to recover from failure regarding the communication service. If there are no data packets received during the survival time 232, a service error or failure 235 may be reported.

In cellular communication a terminal device may perform neighbour cell measurements. Neighbour cell measurements may comprise for example measuring reference signals and other carrier components of a neighbour cell. If the neighbour cell operates at a different frequency than the serving cell, the terminal device may have to suspend communication with the serving cell. This service gap may be understood as an inter-frequency measurement. The time duration during which the terminal device suspends its communication with the serving cell to perform inter-frequency measurements of a neighbour cell may be understood as a measurement gap, MG. In general, during a measurement gap a terminal device is to perform measurements on an indicated frequency and it does not perform transmissions on PUCCH and PUSCH channels and does not transmit sounding reference signal, SRS, in UL direction. For DL, the terminal device may not monitor PDCCH, for example scheduling, and may not receive data on downlink shared channel, PDSCH. It is to be noted though that the random access procedure may be an exception. For example, if random access is triggered by the terminal device, it is allowed to send msg1/msg2 and monitor for msg2/msg4 during a measurement gap.

When neighbour cell measurements are performed, parameters may be used to configure a measurement gap pattern for the measurements the terminal device is to perform during a measurement gap. The neighbour cell may be understood as a target cell if the terminal device is to perform mobility to it. Mobility may be understood as a reselection or handover. Additionally, aspect such as duration of the gap, periodicity of the gap, offset of the gap, and timing advance of the gap may be configured for a measurement gap pattern. It is to be noted that the measurement gap pattern may be defined specifically for a frequency or frequency band, or there may be one measurement gap pattern that is applicable to a plurality of frequencies of frequency bands. The measurement gap pattern may follow a configuration set out in a specification such as a 3GPP specification in some exemplary embodiments.

A measurement gap may be needed for example when a target cell is operating on a different frequency band than the serving cell as described above. A measurement gap may also be needed if a terminal device has just one transceiver or if it has multiple transceivers, but the other transceivers are not available. Further, a measurement gap may be needed if the other transceivers cannot be used because of interference between the target cell frequency and the serving cell frequency. It is to be noted that also other situations may occur in which a measurement gap is needed.

Figure 3:
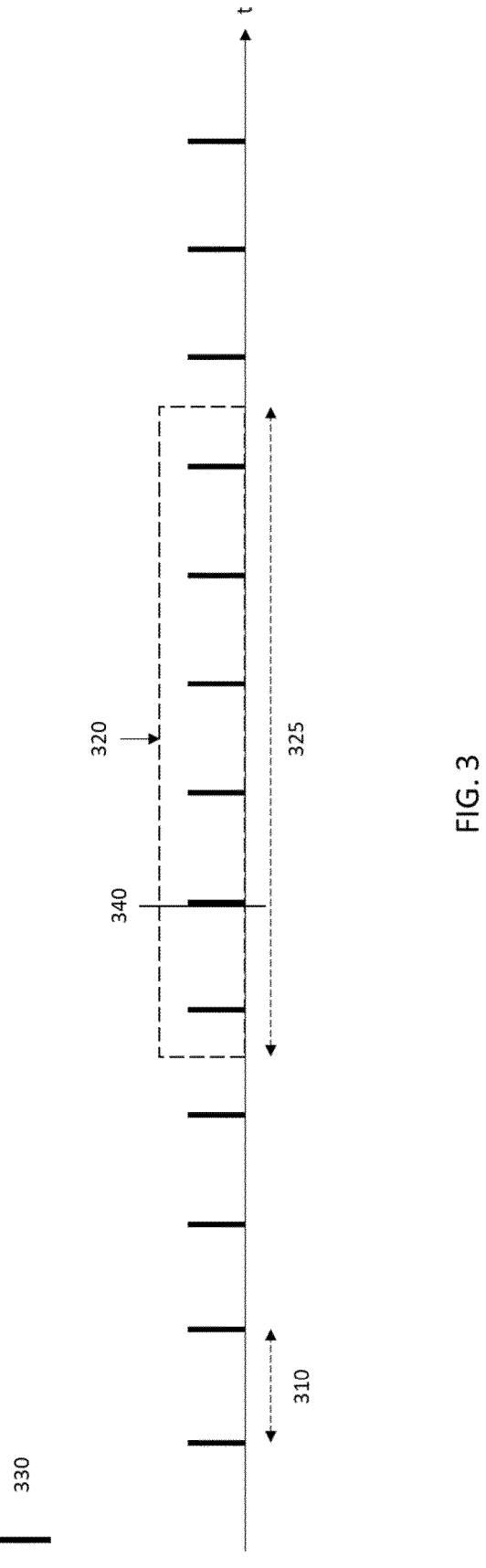
FIG. 3 illustrates an exemplary embodiment of consequence on served traffic if a measurement gap is used.

FIG. 3 illustrates an exemplary embodiment regarding the consequence on served traffic if a measurement gap, MG, is used. During the measurement gap all traffic within the measurement gap would be dropped if the occurrence of the measurement gap is not addressed. In this exemplary embodiment, there is periodic TSC traffic 330. The period 310 between consecutive TSC messages, in other words TSC data packets and/or bursts, is in this exemplary embodiment 0.5 ms. Yet, the terminal device is, in this exemplary embodiment, configured with a measurement gap 320 that has a minimum length 325 of 3 ms in a first frequency range, FR1, that may be 410 MHz-7125 MHz and 1.5 ms in a second frequency range, FR2, that may be 24250 MHz-52600 MHz. In this exemplary embodiment the terminal device is not expected to transmit or receive anything from the serving cell during a configured measurement gap. For example, the terminal device is not expected to receive PDSCH or PDCCH and the terminal device is not expected to transmit PUSCH, PUCCH or SRS. With requirements of TSC traffic of 0.5 ms periodicity and if the survival time is for example 1 or 2 consecutive transmissions equivalents, a measurement gap will result in system outage. As can be seen a survival time violation 340 occurs thereby compromising the quality of service, QoS. It would be beneficial to be able to avoid this type of a survival time violation and enable for example 5G to support various vertical applications.

In an exemplary embodiment, a terminal device utilizes a first radio resource allocation pattern. This first radio resource allocation pattern may also be called as a normal, reference or default radio resource allocation pattern that is utilized when a measurement gap does not occur and optionally may be utilized also during an occurrence of a measurement gap. In this exemplary embodiment, an access node such as a gNB, may configure a terminal device to be served with at least one additional radio resource allocation pattern, in other words, at least a second radio resource allocation pattern, to be utilized by the terminal device during a measurement gap.

In some exemplary embodiments, the second radio resource allocation pattern may be active only during a measurement gap. It is to be noted that a terminal device may be capable of performing a fast transition between different frequencies for both intra- and inter-frequencies. The fast transition may be performed for example within tens of nanoseconds.

For example, the gNB may configure the first radio resource allocation pattern to the terminal device for the normal communication operations including the measurement during the measurement gap and reporting thereof. Besides, the gNB may further configure at least one second radio resource allocation pattern which can be utilized during the measurement gap in case of the survival time violation is expected. The configuration information for the first and/or the second radio resource allocation pattern may be transmitted to the terminal device by using a high layer signal (e.g., RRC, MAC CE etc.).

The at least one additional radio resource allocation pattern (e.g., the second radio resource allocation pattern) may be determined based on the QoS of the traffic, that may be, without loss of generality, TSC traffic, such that violations to the QoS requirements may be avoided. Further, the at least one additional radio resource allocation pattern may be determined such that configured TSCA1 parameters are considered. TSCA1 parameters may comprise for example parameters of survival time, packet delay budget, AN-PDB, and/or maximum data burst volume, MDBV. The at least one additional radio resource allocation pattern may further be determined by considering also the timing of the synchronization system block, SSB, or channel state information reference signal, CSI-RS, transmissions from neighbour cells of which the terminal device is to perform neighbour cell measurements during a measurement gap.

In general, a quality of service violation may be determined based on at least one of the following: quality of service, TSCA1 parameters, general parameters and/or reference signals. General parameters may comprise for example one or more of a packet delay budget, a maximum data burst volume parameter and/or a communication service availability parameter.

Further, the at least one additional radio resource allocation pattern may be determined such that during a measurement gap the terminal device may switch between transmission and/or reception of TSC/URLLC data and measurements of neighbour cell SSBs. If there are in addition to the default radio resource allocation pattern at least one additional radio resource allocation pattern that may be utilized during a measurement gap, the terminal device may, in some exemplary embodiments, determine which available radio resource allocation pattern to utilize during the measurement gap and the terminal device may also have one or more radio resource allocation patterns active during a measurement gap. The transmission may be such that it does not negatively impact the QoS of the traffic or the availability of neighbour cell measurements. This transmission may be achieved by providing time diversity for the measurements such that the terminal device may conduct measurements throughout different parts of the measurement gap and/or over multiple different measurement gaps.

In some exemplary embodiments, when the first and the second radio resource allocation pattern have been configured to the terminal device, the activation of the second radio resource allocation pattern may be indicated by the gNB as explicit manner or implicit manner. For example, the gNB may transmit an indication to the terminal device. Or, if the first and the second radio resource allocation pattern are configured simultaneously, the terminal device applies the first radio resource allocation pattern outside of the measurement gap for communication and uses the second radio resource allocation pattern during the measurement gap.

Figure 4:
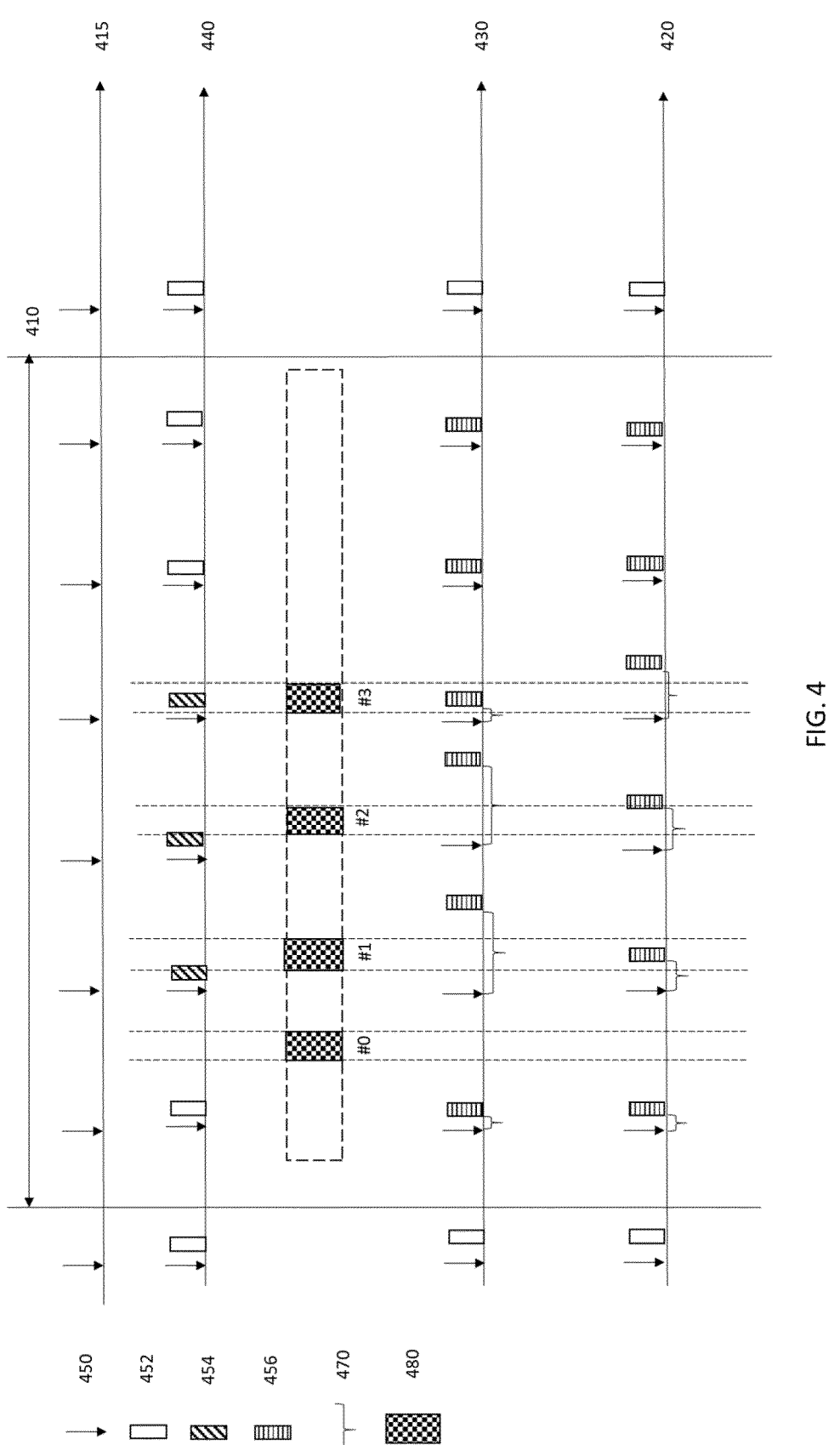
FIG. 4 illustrates an exemplary embodiment in which a radio resource allocation pattern is utilized.

FIG. 4 illustrates an exemplary embodiment in which a plurality of radio resource allocation patterns are utilized. The measurement gap 410 in this exemplary embodiment has a duration of 3 ms, although other durations could be used as well. In this exemplary embodiment, there are two different radio resource patterns, 420 and 430, that are configured by an access node and provided to the terminal device and may be utilized during the measurement gap 410. There is also illustrated a default radio resource allocation pattern 440 that is utilized by the terminal device before and after an occurrence of the measurement gap 410. The default radio resource allocation pattern 440 may also be understood as a first radio resource allocation pattern. Thus, when the measurement gap 410 occurs, the radio resource pattern allocation 440 may continue to be utilized by the terminal device or it may be replaced by radio resource allocation pattern 420 or 430. In this exemplary embodiment, like in the exemplary embodiment of FIG. 3, there are data bursts 450 that occur periodically. In this exemplary embodiment the periodicity is 0.5 ms, but the periodicity could have another duration as well. The occurrence of data bursts 450 are illustrated in 415.

The radio resource allocations according to the radio resource allocation patterns 420 and 430 are also illustrated. As resource allocations 452 occur outside the measurement gap 410, those are not affected as the default radio resource allocation pattern 440 is utilized before and after the measurement gap occurs. Also, if the resource allocations 452 occur during the measurement gap as part of the first radio resource allocation pattern 440 but do not collide with reference signals 480, they may also be considered as resource allocations not affected. If the default radio resource allocation pattern 440 is utilized during the measurement gap 410, then resource allocations 454 collide with occurrences of reference signals 480. Thus, resource allocations 454 are discarded and therefore the radio resource allocation pattern 440 may result in violation of QoS. Alternatively, in some exemplary embodiments, the terminal device may drop the measurements which may have an effect on the measurement accuracy. This may further affect the reliability of transmission during a handover. The reference signals 480 are transmitted by a neighbour cell. The reference signals may use the same frequency, or they may use different frequencies.

Additionally, in some exemplary embodiments, the terminal device may alternate between the radio resource allocation patterns 420 and 430 during a measurement gap or in between measurement gaps in order to avoid violation of QoS (or, survival time violation). As is illustrated in FIG. 4, there are delays 470 that do not cause survival time violation in the radio resource allocation patterns 420 and 430. In case the terminal device uses the radio resource allocation pattern 430 during the measurement gap 410, the fifth data radio resource allocation 456 for transmission collides with a reference signal #3 and is consequently discarded. In case the radio resource allocation pattern 420 is used by the terminal device during the measurement gap 410, the third and the fourth data radio resource allocations 456 for transmissions collide with reference signals #1 and #2 as is illustrated in FIG. 4 and are consequently discarded.

As is illustrated in FIG. 4, the terminal device may not be able to simultaneously transmit and/or receive data using a single configured radio resource pattern, which may be the one used when there is no measurement gap occurring and perform measurements on SSB indexed #1, #2 and #3. Thus, it may be beneficial if the terminal device is configured with at least one additional radio resource pattern that may be used during a measurement gap instead of using the default radio resource allocation pattern that is otherwise used. In this exemplary embodiment, the additional radio resource allocation patterns are the radio resource allocation patterns 420 and 430. The terminal device may transmit and/or receive data and measure SSB index #0, #1 and #2 with the radio resource allocation pattern 430, and SSB indexes #0 and #3 with the radio resource allocation pattern 420. By alternating between radio resource allocation pattern 420 and 430 in subsequent measurement periods, the terminal device may perform measurements on all the SSB indexes while the QoS of the TSC traffic is not impacted. That is to say, if the two or more additional radio resource allocation patterns have been configured, the terminal device is able to switch the configured patterns with predetermined order indicated by the access node.

In general, to be able to effectively apply a radio resource allocation pattern it is beneficial to specify a terminal device capability class with a defined and ability to do fast switching between transmission/reception of TSC/URLLC data and measurements of neighbor cell SSB/CSI-RS transmissions. It is also beneficial to determine radio resource allocation pattern(s) to be active during a measurement gap, taking into account requirements from the traffic flow, e.g. via TSCA1 including Survival Time parameters for TSC flows and knowledge of the AN-PDB and MDBV for URLLC type flows. Additionally, it is also beneficial to signal the radio resource allocation pattern(s) to be used during a measurement gap to the terminal device. This may be done along with a set of associated rules. Such rules may relate to for example extending the measurement feedback reporting timeout, and/or associating HARQ-ACK feedback, whether the terminal device is to prioritize SSB measurements or Tx/Rx data in case of collisions, etc. Further beneficial aspects comprise access node adjusting the measurement reporting timeline in case of a collision between URLLC/TSC traffic and MG and/or optimizing the allocated radio resource patterns considering the expected traffic arrivals, resource pattern(s), priority and target cell SSB or CSI-RS locations.

Figure 5:
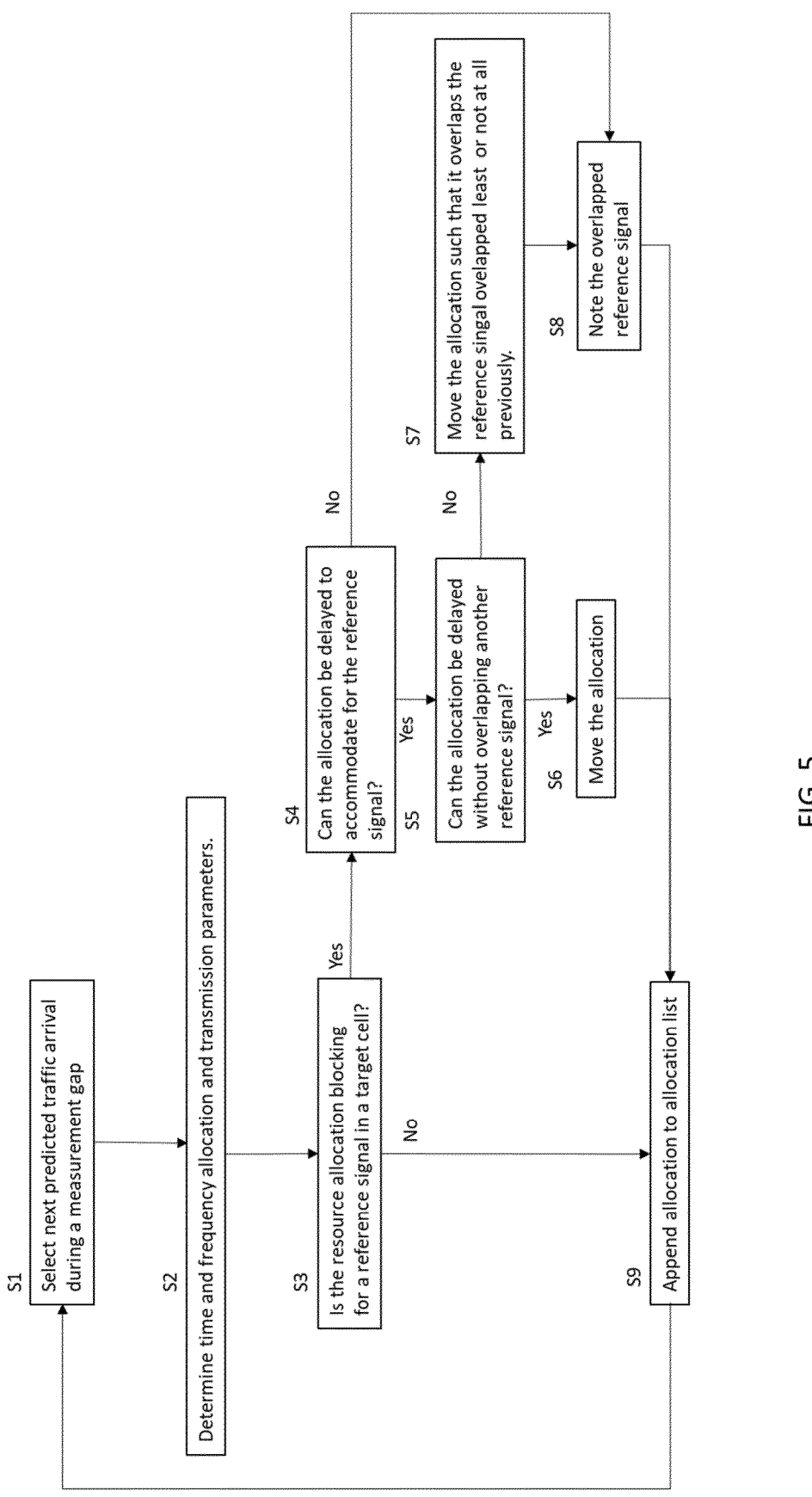
FIG. 5 illustrates a flow chart according to an exemplary embodiment.

FIG. 5 illustrates a flow chart according to an exemplary embodiment in which a at least one additional radio resource allocation pattern to be used by a terminal device during a measurement gap is determined. The determination, which may also be understood as configuring, may be performed by an access node such as a gNB. The determination may begin with identifying a situation in which the pre-determined quality of service, QoS, may be violated during a measurement gap. This may be determined for example based on identifying critical data flows that may for example be TSC data packets and/or data packet bursts. For example, it may be determined that the duration of a survival time may be less than a duration of a measurement gap, and/or determining that reliability and/or latency requirements may not be met during a measurement gap. The measurement gap may be a configured measurement gap or a feasible measurement gap. For example, latency and reliability may be relevant aspects to be considered for URLLC traffic which could present unpredictable traffic. This is illustrated in general in S1 in which next predicted traffic arrival during a measurement gap is selected.

For each expected packet arrival an initial time allocation and a set of transmission parameters are defined. For example, an expected packet arrival may be TSC traffic by the TSCA1 and/or, a semi-persistent scheduling, SPS or configured grant, CG configuration and/or URLLC with unpredictable traffic, which may be given by latency requirements. The set of transmission parameters may comprise one or more of the following: time offsets between neighboring traffic transmission opportunities, modulation and coding scheme, MCS, frequency allocation, hybrid automatic repeat request, HARQ. Regarding the MCS selection, a safety margin may be estimated based on an estimated and expected signal to interference and noise, SINR, to improve probability of successful transmission. The frequency allocation may depend on for example the MCS, transport block size, TBS, and allocations to other terminal devices. If HARQ feedback is utilized, then serving a traffic arrival may require a combination of the allocations in one direction and another combination in the opposite direction. It is to be noted that while the process of determining at least one additional radio resource allocation pattern (e.g., the second radio resource allocation pattern) for UL and DL comprises same steps, UL and DL may be treated separately. In some exemplary embodiments, when estimating the parameters from a semi-static configuration, the estimated parameters may be used to determine the transmission parameters described above. Further, in some exemplary embodiments the one or more additional radio resource allocation patterns may be subject to timing constraints, such as UL/DL transitions and processing times for feedback, as well as TX pre-processing time. Defining the initial time allocation and the set of transmission parameters for each expected packet arrival is illustrated in general in S2 in which time and frequency allocation and transmission parameters are determined.

In this exemplary embodiment, for each radio resource allocation, it is checked whether the allocation overlaps with a target reference signal, such as SSB or CSI-RS, or not. Although in this exemplary embodiment this step is performed for each radio resource allocation, in some other exemplary embodiments it could be extended to be performed at multiple radio resource allocation patterns. This is illustrated in general in S3 in which it is determined if the resource allocation is blocking for a reference signal in a target cell. If not, then the identified allocation is added to an allocation list along with the transmission parameters as one radio resource allocation pattern that may be used during a measurement gap. This is illustrated in general in S9 in which the allocation is appended to the allocation list. If, on the other hand, the resource allocation is blocking for a reference signal in a target cell, then it is determined if the radio resource allocation pattern may be shifted in time until it is either not overlapping a reference signal or just before a QoS parameter, for example survival time, is violated, whichever comes first. This is illustrated in general in S4 in which it is determined if the radio resource allocation pattern may be delayed to accommodate for the reference signal. If shifting is successful, it is then determined if it results in another reference signal being overlapped. This is illustrated in general in S5 in which it is determined if the radio resource allocation pattern can be delayed without overlapping another reference signal. If yes, then the radio resource allocation pattern may be shifted as illustrated in S6. On the other hand, if in S5 the determination is no, then it is determined if one or more of the overlapped reference signals has been overlapped before after which the one which has not been overlapped before, or has been overlapped the least is selected. This is illustrated in S7. Then in S8, the overlapped reference signal is noted such that it may be taken into account for another measurement gap. If the determination in S4 on the other hand was no, then the determination process also proceeds to S8. Finally, in S9, the radio resource allocation pattern is appended to a list of allocations forming the radio resource allocation pattern. The procedure may be repeated to form one or more additional radio resource allocation patterns to serve the QoS violated traffic arrivals and the noted reference signals.

It is to be noted that for unpredictable traffic such as URLLC, or for unknown SSB/CSI-RS locations, the radio resource allocation pattern may be selected based on a target periodicity, but with a pseudo random initial allocation time offset, that may be signaled by the access node, of maximum of a single period, from measurement gap to measurement gap.

Once at least one radio resource allocation pattern, in addition to the default radio resource allocation pattern, has been determined and added to a list of radio resource allocation patterns that may be used by a terminal device during a measurement gap, a radio resource allocation pattern may be determined for a terminal device from the list. There may be at least one radio resource pattern determined per active direction (e.g., UL or DL) by the access node. In some exemplary embodiments, the determined radio resource allocation pattern may then be translated into a radio resource control, RRC, message that then provides the radio resource allocation pattern that may be used to configure a terminal device with the determined radio resource allocation pattern. The resource allocation configuration may comprise for example at least one of the following: initial allocation offset(s), time between allocation(s), frequency resource(s), MCS index(s), allowed logical channel, LCH, index(s), PxSCH priority, applicable measurement gap index(s).

Figure 6:
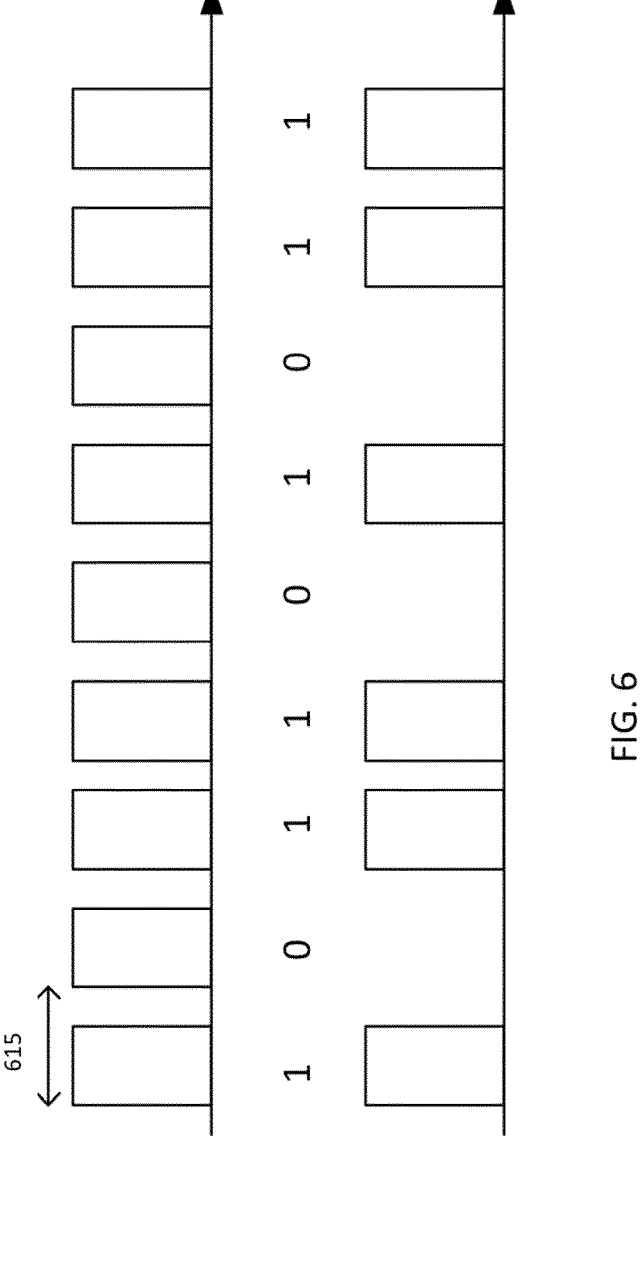
FIG. 6 illustrates an exemplary embodiment of a radio resource allocation bitmap.

FIG. 6 illustrates an exemplary embodiment of a radio resource allocation bitmap. A radio resource allocation pattern may also be provided to a terminal device by configuring configured grant, CG, or semi-persistent scheduling, SPS, allocations together with a bitmap. The bitmap may then indicate which of the CG/SPS occasions may be used by the terminal device during a MG. In some exemplary embodiments, the bitmap is applied only during an MG. In FIG. 6 CG occasions per CG configuration 610 are illustrated along with CG periodicity 615. Bitmap configuration 620 and CG occasions that may be utilized by the terminal device 630 are also illustrated. As can be seen, the CG occasions that may be utilized by the terminal device are indicated in the bitmap using bit 1. Although CG occasions are illustrated, it is to be noted that SPS occasions that may be utilized by the terminal device may be illustrated using a bitmap in a similar manner.

It is to be noted that although an access node configures at least one radio resource allocation pattern, it may also configure multiple radio resource configuration patterns per direction. This may be beneficial for example if the access node is serving multiple QoS flows. Also, in some exemplary embodiments, a set of rules may be configured and associated with the radio resource allocation pattern. The rules may comprise for example HARQ-ACK configuration. There are multiple options of how to configure HARQ-ACK for the traffic if transmitted on resources allocated with the proposed embodiments. For example, for DL traffic a PUCCH slot/sub-slot may be associated to carry HARQ-ACK for all resources or one per priority. This may be indicated by a K1 value and a PUCCH resource ID, using the last allocation in the measurement gap as a reference. For UL traffic, for example, a HARQ process or a new index carried with the DCI may be used to indicate the that the feedback is for a resource allocation pattern. Yet, alternatively all radio resource allocation patterns may be bundled within the measurement gap. Further, alternatively, for example the HARQ-ACK feedback may be disabled temporarily. Another example that may be comprised in rules is measurement report timeout extension. In some exemplary embodiments the access node may also extend the allowed time for the UE to report measurements. The timeout may be set proportional to the number of patterns and MGs needed to reach a target reference sequence acquisition.

In some exemplary embodiments, the radio resource allocation pattern(s) and associated rules may be signalled to the terminal device together with a measurement gap configuration by using for example RRC or medium access control control element, MAC CE, or physical, PHY, signaling, and in some cases combination of different signaling. If more than one radio resource allocation patterns are configured, the access node may dynamically signal to the terminal device prior to each, or at least some, measurement gap occurrence which pattern is to be used. This signalling may be done for example by using PHY (e.g., DL/UL grant) or MAC signalling. In this exemplary embodiment, the terminal device may use the configured radio resource pattern allocation outside the measurement gap and also within the measurement gap, if not otherwise instructed by the access node, such as a gNB, prior to the occurrence of the measurement gap.

Figure 7B:
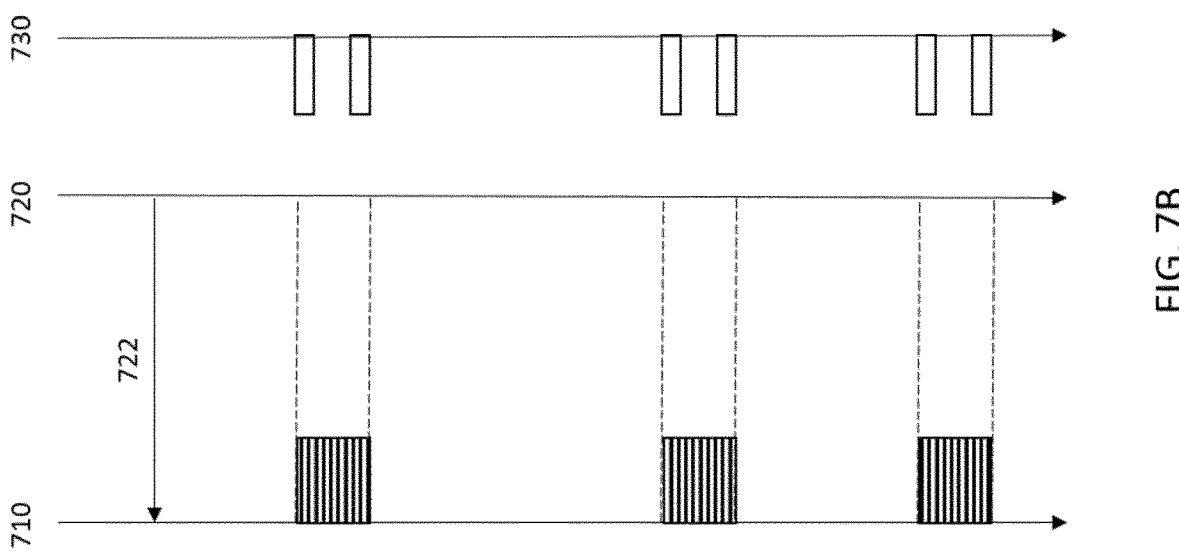
FIGS. 7A and 7B illustrate exemplary embodiments of a terminal device with at least a first and a second radio resource allocation patterns.
Figure 7A:
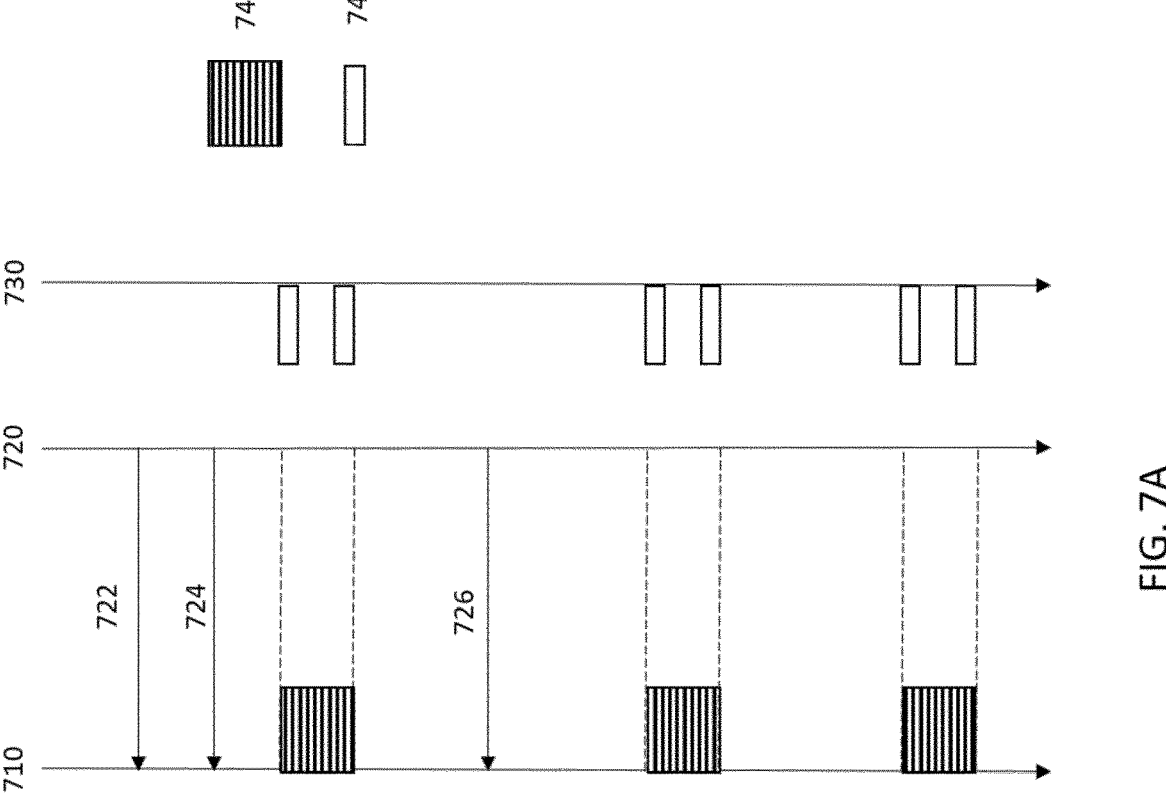

FIG. 7A illustrates an exemplary embodiment in which the terminal device 710 has a reference radio resource allocation pattern to be used outside of a measurement gap occurrence. The terminal device (e.g., UE) 710 also has two additional radio resource configuration patterns that are to be used by the terminal device during a measurement gap 742 such that the reference signal 744 transmitted by a target access node 730, that may be a target gNB, may be measured. The reference signal 744 may be for example SSB or any other suitable one or more reference signals (e.g., CIS-RS). The additional radio resource allocation patterns may be transmitted 722 via a high layer signaling (e.g., RRC or MAC CE) to the terminal device 710 by the access node 720 that may be a serving gNB. In this exemplary embodiment the terminal device first utilizes, which may also be understood as applying, the reference radio resource allocation pattern. The access node 720 may then transmit an indication 724, 726 that indicates which radio resource allocation pattern is to be utilized during the upcoming measurement gap 742. After the measurement gap 742, the terminal device 710 then utilizes the reference radio resource allocation pattern again.

FIG. 7B then illustrates another exemplary embodiment in which the terminal device 710 has a reference radio resource allocation pattern to be utilized outside of measurement gaps 742 and additionally one other radio resource allocation pattern to be utilized during a measurement gap 742. One or both of these radio resource allocation patterns may be signalled 722, for example dynamically signalled, to the terminal device 710 by the access node 720. In this exemplary embodiment, the terminal device 710 utilizes the additional radio resource allocation pattern during the measurement gaps 742 and therefore dynamic signalling from the access node prior to a measurement gap indicating which radio resource allocation pattern to utilized is not needed.

In a further exemplary embodiment, a combination of exemplary embodiments illustrated in FIGS. 7A and 7B may be utilized. In this exemplary embodiment the access node may configure the terminal device with multiple alternative radio resource patterns to be utilized during a measurement gap, one of which may be configured as the default radio resource allocation pattern to be utilized during measurement gaps. If prior to a measurement gap occurrence no signalling is received from the access node indicating which radio resource allocation pattern the terminal device is to utilize, the terminal device utilizes the default resource pattern which in this exemplary embodiment is different from the reference resource pattern used outside of measurement gaps.

In yet another exemplary embodiment, when the access node signals multiple radio resource allocation patterns, the terminal device may determine the default radio resource allocation pattern to be used during a measurement gap as a combination of the multiple patterns. In this case, the terminal device may be allowed to prioritize SSB/CSI-RS measurements over transmission and/or reception of TSC data if one of the Tx/Rx opportunities collides with SSB occasions.

The exemplary embodiments described above may have an advantage that they can help avoiding systematic collision that may occur between transmission of SSBs to be measured and Tx/Rx opportunities of TSC data. It is also to be noted that even though the exemplary embodiments above were discussed in view of TSC, the exemplary embodiments described above may be applicable to any other type of traffic as well.

Figure 8:
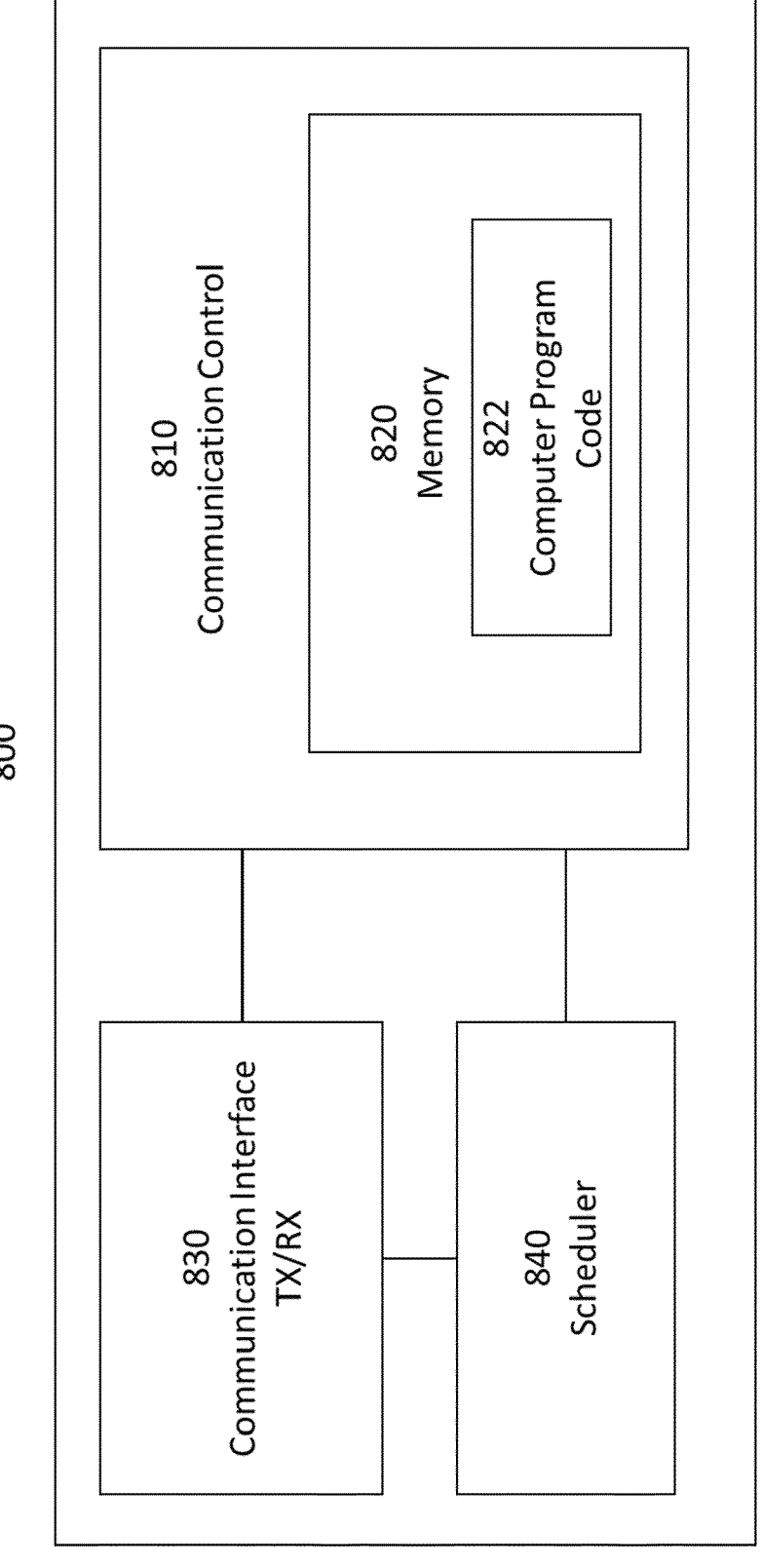
FIGS. 8 and 9 illustrate exemplary embodiments of an apparatus.

The apparatus 800 of FIG. 8 illustrates an example embodiment of an apparatus that may be an access node or be comprised in an access node. The apparatus may be, for example, a circuitry or a chipset applicable to an access node to realize the described embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out any one of the example embodiments of the access node described above.

The memory 820 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 800 may further comprise a communication interface 830 comprising hardware and/or software for realizing communication connectivity according to one or more communication protocols. The communication interface 830 may provide the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources.

Figure 9:
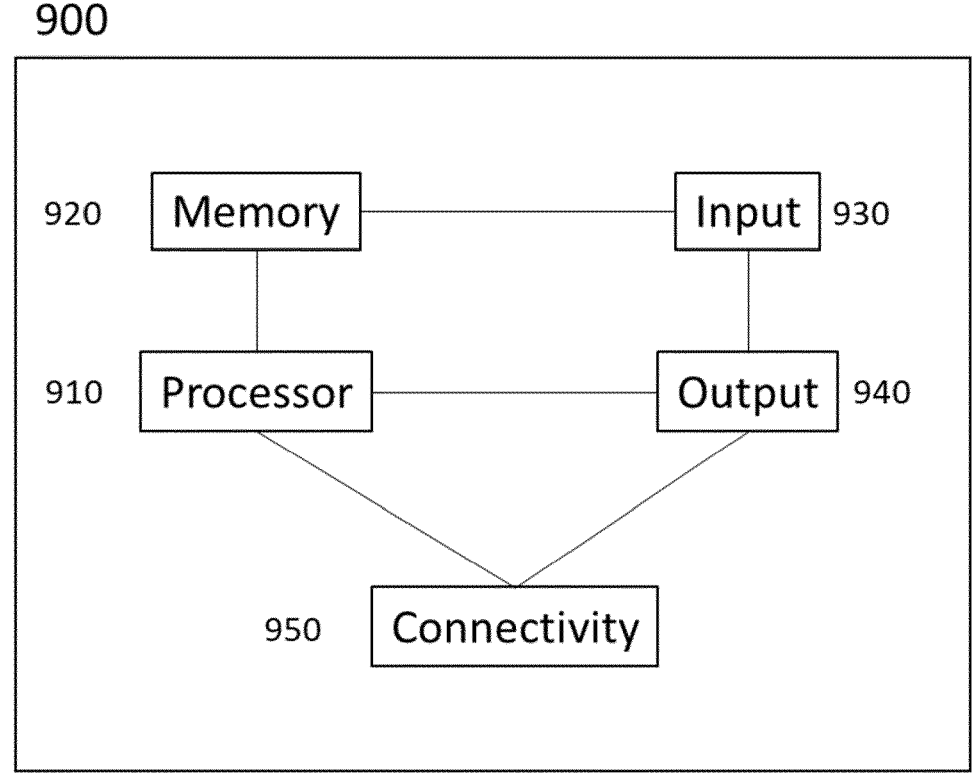

FIG. 9 illustrates an apparatus 900, which may be an apparatus such as, or comprised in, a terminal device, according to an example embodiment. The apparatus 900 comprises a processor 910. The processor 910 interprets computer program instructions and processes data. The processor 910 may comprise one or more programmable processors. The processor 910 may comprise programmable hardware with embedded firmware and may, alternatively or additionally, comprise one or more application specific integrated circuits, ASICs.

The processor 910 is coupled to a memory 920. The processor is configured to read and write data to and from the memory 920. The memory 920 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 920 stores computer readable instructions that are execute by the processor 910. For example, non-volatile memory stores the computer readable instructions and the processor 910 executes the instructions using volatile memory for temporary storage of data and/or instructions.

The computer readable instructions may have been pre-stored to the memory 920 or, alternatively or additionally, they may be received, by the apparatus, via electromagnetic carrier signal and/or may be copied from a physical entity such as computer program product. Execution of the computer readable instructions causes the apparatus 900 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 900 further comprises, or is connected to, an input unit 930. The input unit 930 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 930 may comprise an interface to which external devices may connect to.

The apparatus 900 also comprises an output unit 940. The output unit comprises or is connected to one or more displays capable of rendering visual content such as a light emitting diode, LED, display, a liquid crystal display, LCD and a liquid crystal on silicon, LCoS, display. The output unit 940 may comprise two displays to render stereoscopic visual content. One display to render content to the left eye and the other display to render content to the right eye. The output unit 940 may further comprise a transmission unit, such as one or more waveguides or one or more lenses, to transfer the rendered visual content to the user's field of view. The output unit 940 further comprises one or more audio outputs. The one or more audio outputs may be for example loudspeakers or a set of headphones.

The apparatus 900 may further comprise a connectivity unit 950. The connectivity unit 950 enables wired and/or wireless connectivity to external networks. The connectivity unit 950 may comprise one or more antennas and one or more receivers that may be integrated to the apparatus 900 or the apparatus 900 may be connected to. The connectivity unit 950 may comprise an integrated circuit or a set of integrated circuits that provide the wireless communication capability for the apparatus 900. Alternatively, the wireless connectivity may be a hardwired application specific integrated circuit, ASIC.

It is to be noted that the apparatus 900 may further comprise various component not illustrated in the FIG. 9. The various components may be hardware component and/or software components.

Even though the embodiments have been described above with reference to an example according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising:

at least one processor; and at least one memory including instructions, the at least one memory and the instructions configured, with the at least one processor, to cause the at least one processor to perform the following operations:

configuring a first radio resource allocation pattern;

identifying that a quality of service violation is to occur during a measurement gap of a terminal device when the terminal device utilizes the first radio resource allocation pattern, wherein the identifying comprises determining that the first radio resource allocation pattern blocks at least one reference signal that a target access node is configured to transmit;

determining at least one second radio resource allocation pattern for utilization by the terminal device during the measurement gap; and transmitting the at least one second radio resource allocation pattern to the terminal device.

2. The apparatus according to claim 1, wherein the instructions further cause the at least one processor to determine the quality of service violation based on at least one of the following: quality of service, one or more time sensitive communications assistance information parameters, one or more general parameters, or one or more reference signals.

3. The apparatus according to claim 2, wherein the one or more general parameters comprise one or more of a packet delay budget parameter, a maximum data burst volume parameter, and a communication service availability parameter, and wherein the one or more reference signals comprise one or more of a synchronization signal block and a channel state information reference symbol.

4. The apparatus according to claim 1, wherein the instructions further cause the at least one processor to: determine if the first radio resource allocation pattern is to be shifted in time.

5. A method comprising:

configuring a first radio resource allocation pattern;

identifying that a quality of service violation is to occur during a measurement gap of a terminal device when the terminal device utilizes the first radio resource allocation pattern, wherein the identifying comprises determining that the first radio resource allocation pattern blocks at least one reference signal that a target access node is configured to transmit;

determining at least one second radio resource allocation pattern for utilization by the terminal device during the measurement gap; and transmitting the at least one second radio resource allocation pattern to the terminal device.

6. The method according to claim 5, wherein the identifying comprises determining the quality of service violation based on at least one of the following: quality of service, one or more time sensitive communications assistance information parameters, one or more general parameters, or one or more reference signals.

7. The method according to claim 6, wherein the one or more general parameters comprise one or more of a packet delay budget parameter, a maximum data burst volume parameter, and a communication service availability parameter, and wherein the one or more reference signals comprise one or more of a synchronization signal block and a channel state information reference symbol.

8. The method according to claim 5, further comprising:

determining if the first radio resource allocation pattern is to be shifted in time.

* * * * *